United States Patent [19]

Ohsawa

[11] Patent Number: 4,919,511

[45] Date of Patent: Apr. 24, 1990

[54] FIBRE-TYPE LIGHT CONVERSION DEVICE

[75] Inventor: Seiichi Ohsawa, Saitama, Japan

[73] Assignee: Pioneer Electronic Corporation, Tokyo, Japan

[21] Appl. No.: 397,912

[22] Filed: Aug. 24, 1989

[30] Foreign Application Priority Data

Feb. 3, 1989 [JP] Japan .................................. 1-26477
Feb. 13, 1989 [JP] Japan .................................. 1-34643

[51] Int. Cl.⁵ .............................................. G02F 1/37
[52] U.S. Cl. .................................. 350/96.29; 307/430; 350/3.7; 350/162.16
[58] Field of Search ............... 350/253, 162.16, 96.19, 350/96.14, 3.6–3.8, 1.7, 96.29; 307/425–430

[56] References Cited

U.S. PATENT DOCUMENTS

| | | | |
|---|---|---|---|
| 2,080,120 | 5/1937 | Everett | 350/253 X |
| 2,442,913 | 6/1948 | Abrams et al. | 350/253 |
| 3,728,117 | 4/1973 | Heidenhain et al. | 350/3.7 X |
| 4,838,638 | 6/1989 | Kamiyama et al. | 350/96.19 |

*Primary Examiner*—John D. Lee
*Attorney, Agent, or Firm*—Foley & Lardner, Schwartz, Jeffery, Schwaab, Mack, Blumenthal & Evans

[57] ABSTRACT

A fibre-type light conversion device for converting the wavelength of an incident light. According to the first feature of the invention the device has a structure in which a holographic element whose complex transparency varies periodically with respect to the distance from an optical axis is used as a means for transforming the light, to which the conversion of wavelength has been performed by a fibre-type SHG, into a parallel light. According to the second feature of the invention, the device is constructed so that the temperature of the light source or the holographic element can be controlled, thereby a parallel light having planer wave fronts is surely generated irrespectively of differences in the shape of the fibre-type SHG or variations in the refractive index.

8 Claims, 4 Drawing Sheets

LIGHT SECOND HARMONIC
WAVE RING

LIGHT SECOND HARMONIC WAVE RING

PRIMARY LIGHT
SECONDARY LIGHT HAVING CONICAL WAVE FRONT
SECONDARY LIGHT HAVING PLANER WAVE FRONT

FIG.3
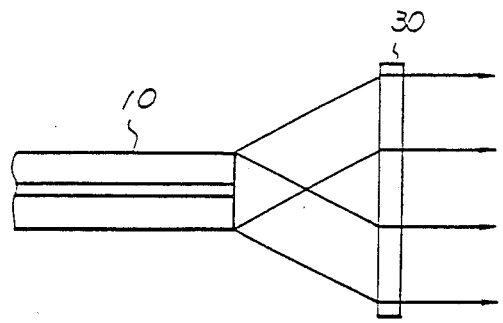
FIG.4A
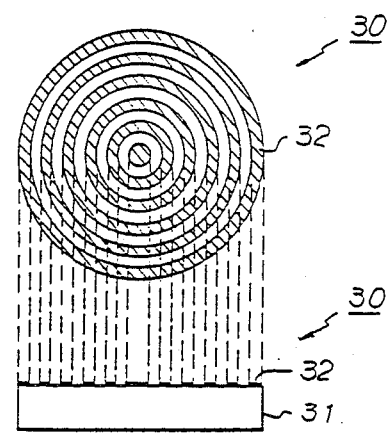
FIG.4B
FIG.5
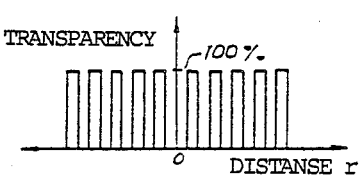

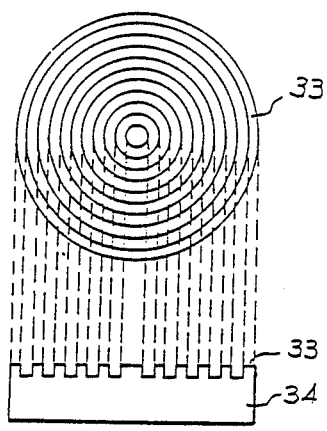
FIG. 6A
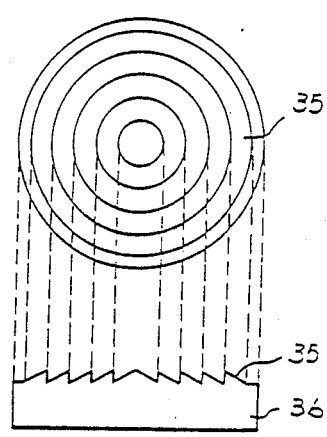
FIG. 8A
FIG. 6B
FIG. 8B
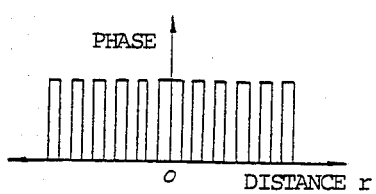
FIG. 7
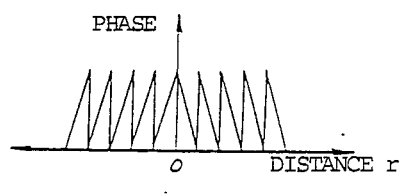
FIG. 9

FIBRE-TYPE LIGHT CONVERSION DEVICE

BACKGROUND OF THE INVENTION

1. Field of the Invention

The present invention relates to a fibre-type light conversion device.

2. Description of Background Information

An optical pickup is known by which high density writing and reading of information on and from a disc are enabled by changing the wavelength of a laser beam emitted from a laser source to a half the original wavelength by means of a light conversion device (reference is directed to Japanese Patent Application Laid-Open No. 61-50122).

As the light conversion device for use in this type of pickup, there is an optical fibre-type SHG (Second Harmonics Generator) using a second-order non-linear optical effect. A phase matching of Cerenkov radiation system is adopted in the optical fibre-type SHG. With this system, it is possible to generate a second harmonic wave (referred to as SH wave hereinafter) whose phase matching condition is attained almost automatically. The general concept of this device is shown in FIGS. 1A and 1B.

In FIG. 1A, when the fundamental wave mode is propagated through the core with the effective reflective index of $N(\omega)$, the non-linear polarizing wave generating the SH wave is also propagated at the same phase velocity $C/N(\omega)$ (C is the speed of light). It is assumed that this non-linear polarizing wave produces the SH wave in a direction making an angle $\theta$ with respect to the direction of the wave guide at a point A, and generates the SH wave in the direction of $\theta$ as before at a point B, after the elapse of a unit time. If the SH wave generated at the point A propagates through the clad and reaches to a point C after the elapse of the unit time and the angle $\theta$ is such an angle that lines AC and BC are perpendicular to each other, then the plane of the SH wave which is generated from the non-linear polarized wave between A and B becomes equal to BC, and as a result, a coherent SH wave is generated.

The condition of the phase matching is, according to the figure, as follows:

$$N(\omega) = N_{clad}(2\omega) \cos \theta \quad (1)$$

where $N_{clad}(2\omega)$ is the refractive index of the clad for the SH wave. This in turn gives:

$$N(\omega) < N_{clad}(2\omega) \quad (2)$$

This means that the SH is generated automatically in the direction $\theta$ where the phase matching is performed when at least the condition mentioned by the equation (2) is satisfied. Generally, with the refractive indices of the clad and core for the fundamental wave being $n_{clad}(\omega)$ and $n(\omega)$ and with air as the over-layer, the condition for the fundamental wave to propagate through the core as a mode is expressed as follows:

$$N_{clad}(\omega) < N(\omega) < n(\omega) \quad (3)$$

Wavelength dispersion of the clad's refractive index will now be considered. Since $n_{clad}(\omega) < n_{clad}(2\omega)$, the equation (2) is satisfied for all of the fundamental wave modes irrespectively of the diameter of the core so far as the following expression (4) is satisfied.

$$N_{clad}(\omega) < N(\omega) < n_{clad}(2\omega) \quad (4)$$

Moreover, there are fundamental modes satisfying the equation (2) in a certain range of the diameter of the core even under the following condition.

$$N_{clad}(\omega) < n_{clad}(2\omega) < n(\omega)$$

The second harmonic wave generated in this way is propagated in a clad mode as illustrated in FIG. 1B in which total reflection occurs repeatedly at the boundary between the clad and air. Then, the second harmonic wave is emitted in conical shape from the end of the fibre in directions determined by the angle $\theta$ relative to the fibre's direction. The equiphase front of the second harmonic wave emitted in this way is in a conical surface with an axis on the central axis of the fibre.

In order to utilize the second harmonic wave as a light beam for writing and reading information on and from a recording disc as mentioned before, it is necessary to converge the light emerged from the light conversion device on the recording surface of the disk in the form of a small light spot. However, since the equiphase front of the emerging light is in the conical form, it is not possible to converge the emergent light to a degree near to a diffraction limit using a converging lens system made by conventional spherical lenses or aspherical lenses.

Therefore, as illustrated in FIG. 2, it is conceivable to dispose a conical prism 20 with a conical surface in the optical path of the beam emitted from the fibre-type SHG 10, and the conical equiphase front can be converted to a planer equiphase front by collimating the second harmonic (SH) wave (making it parallel) by the function of the conical prism 20. With this arrangement, it becomes possible to converge the light to the diffraction limit by means of a conventional converging lens.

However, because of the conical shape, the production of the conical prism 20 is difficult, and are not suited for the mass-production. Therefore, it is disadvantageous to use a conical lens for reducing the production cost.

OBJECT AND SUMMARY OF THE INVENTION

Therefore, an object of the present invention is to provide a fibre-type light conversion device in which the SH wave is collimated by means of an optical element that is easy to produce and highly applicable to the mass production, and that can be prepared at a low cost.

In a fibre-type light conversion device according to the present invention, a holographic element with a complex transparency which varies periodically with respect to the distance from the optical axis, is used as a means for transforming the light having been converted in wavelength by means of a fibre-type SHG into a parallel light.

As mentioned above, a holographic element is used in place of the conical prism 20, as the conversion device for converting the conical equiphase front into the planar form. Such a holographic element may be prepared at low cost since it can be produced relatively easily, and also suited for the mass production.

On the other hand, if the apical angle $\theta$ of the conical wave front of the SH wave is different from a design value, then the holographic element will not function properly. With respect to this apical angle $\theta$, errors of a degree that cannot be disregarded are generated depending on the form of the fibre-type SHG or due to variations in the refractive index. Therefore, in order that a holographic element can be used for surely converting the secondary light having a conical wave front into a parallel light having planer wave fronts, it is necessary to select a fibre-type SHG with which a desired apical angle $\theta$ is attained, and use it as the conversion device.

Another object of the present invention is therefore to provide a fibre-type light conversion device by which the secondary light having a conical wave front obtained after the conversion of the wavelength is surely transformed into a parallel light having planer wave fronts, without regard to the shape of the fibre-type SHG or variations in the refractive index.

In a fibre-type light conversion device according to a second feature of the present invention, a holographic element is used as the means for converting the secondary light having been converted in wavelength, into a parallel light, and the temperature of the light source or the holographic element is controllable.

BRIEF DESCRIPTION OF THE DRAWINGS

FIG. 3 is a diagram showing the construction of an embodiment of the present invention;

FIGS. 4A and 4B are respectively a plan view and a sectional side elevational view of an example of holographic element;

FIG. 5 is a diagram showing a transparency characteristic of the holographic element shown in FIGS. 4A and 4B;

FIGS. 6A and 6B are respectively a plan view and a sectional side elevational view of another example of optical element;

FIG. 7 is a diagram showing a phase characteristic of the holographic element shown in FIGS. 6A and 6B;

FIGS. 8A and 8B are respectively a plan view and a sectional side elevational view of a further example of holographic element;

FIG. 9 is a diagram showing a phase characteristic of the holographic element shown in FIGS. 8A and 8B.

DETAILED DESCRIPTION OF THE PREFERRED EMBODIMENTS

The preferred embodiments of the present invention will be explained with reference to the accompanying drawing hereinafter.

Figure 1A:
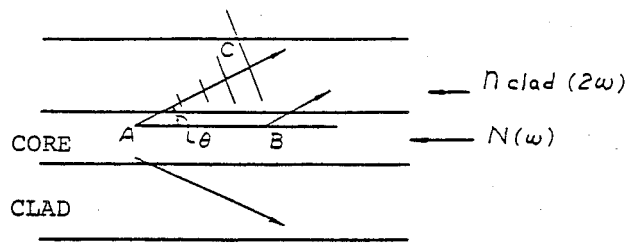
FIGS. 1A and 1B are diagrams for explaining the concept of the Cerenkov radiation system phase matching SHG.
Figure 1B:
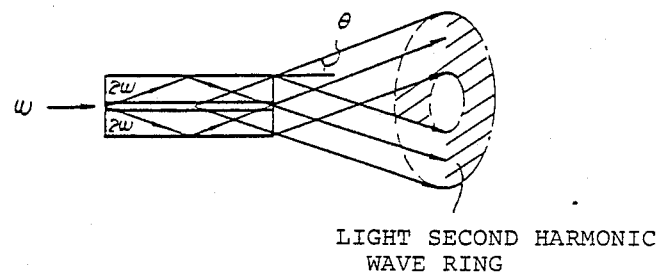
Figure 2:
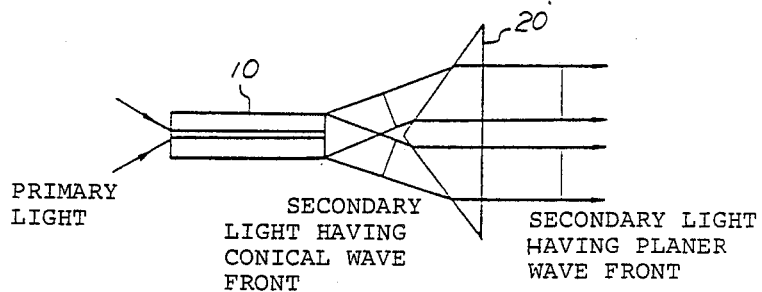
FIG. 2 is a diagram showing the construction of a conventional arrangement in which a conical prism is used.

In FIG. 1 illustrating the first embodiment of the present invention, a secondary light with a conical wave front which is emitted from a fibre-type SHG 10, i.e. a SH wave, is incident on a holographic element 30. The holographic element 30 is, as illustrated in FIGS. 4A and 4B, configured such that a plurality of ring zones each comprising an opaque film are concentrically arranged around an optical axis with a constant pitch on a surface of a transparent substrate 31 made of a glass or a plastic material. In the case of this holographic element 30, the complex transparency varies periodically with respect to the distance r from the optical axis, as illustrated in FIG. 5. Therefore a periodic change in amplitude relative to the distance r is generated for the incident wave. This means, by appropriately determining the pitch of the ring zones 32, the incident secondary light with a conical wave front can be converted to a parallel light having a planer equiphase front.

As described above, the holographic element 30 is used as the means for converting the secondary light into the parallel light. Since the holographic element 30 is easy to produce and higher in adaptability to the mass production as compared with the conical prism which has been used in conventional arrangements, the cost of the device can be reduced consequently.

In the case of the embodiment described above, the holographic element 30 made of the transparent substrate 31 having a plurality of ring zones 32 made of an opaque film and arranged concentrically with a constant pitch on one surface of the substrate 31, is used as the means for converting the secondary light to the parallel light. However, other holographic elements having different configuration can also be used. As an example, it is possible to use a holographic element as shown in FIGS. 6A and 6B which is made up of a transparent substrate 34 having a plurality of ring zones 33 having a rectangular cross-section and arranged concentrically with a constant pitch, i.e. bumps and depressions, on one surface of the substrate 34. In addition, such a holographic element as shown in FIGS. 8A and 8B which is made up of a transparent substrate 36 having ring zones 35 concentrically arranged with a constant pitch forming a cross-section of saw-tooth shape, on one surface of the substrate 36, can be used. An essential structural requirement is that the complex transparency varies periodically with respect to the distance r from the optical axis, so that a periodical change in amplitude or phase with respect to the distance r is generated for the incident light. The phase characteristic of the holographic element shown in FIGS. 6A and 6B is shown in FIG. 7, and the phase characteristic of the holographic element shown in FIGS. 8A and 8B is shown in FIG. 9.

As explained in the foregoing, in the fibre-type light conversion device according to the first feature of the present invention, a holographic element whose complex transparency varies periodically with respect to the distance from the optical axis is used as the means for converting the secondary light to the parallel light. The holographic element has a simple structure relative to the conical prism used in conventional devices, and especially the so-called relief-type holographic element having bumps and depressions on its surface is highly applicable to the mass production because it can be produced by a press work. Thus, the cost of the light conversion device can be reduced by the use of the holographic element.

Figure 10:
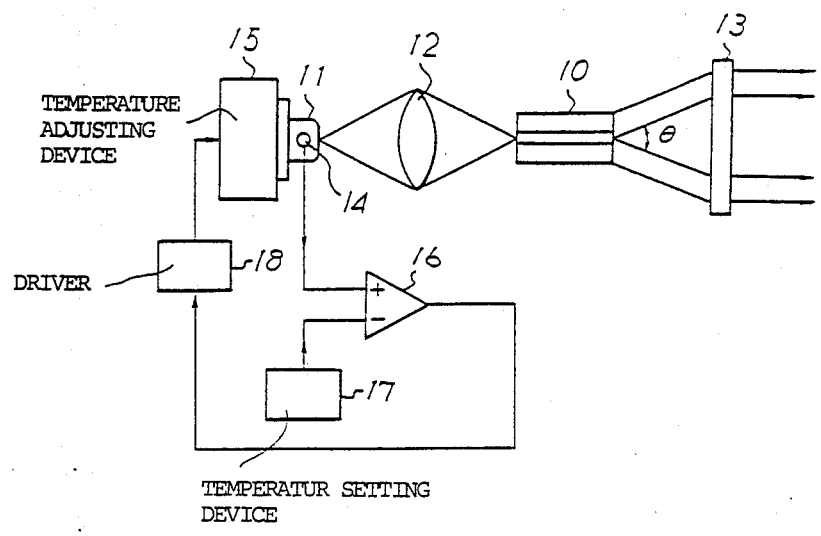
FIG. 10 is a diagram showing another embodiment of the device according to the present invention.

Referring to FIG. 10, the second embodiment of the present invention will be explained. In the arrangement shown in FIG. 10, a laser beam emitted from a semiconductor laser 11 used as the light source, is converged by means of a converging lens 12, and is incident on the fibre-type SHG 10, in which the conversion of wavelength take place. The secondary light having the conical wave front, i.e. the SH wave, is then incident on the holographic element 30. The holographic element 30 has the construction illustrated in FIGS. 4A and 4B as in the case of the previous embodiment, and the explanation of the holographic element itself will not be repeated.

Onto the semiconductor laser 11, a temperature sensor 14 for sensing its temperature such as a thermo couple or a thermistor, and a temperature adjusting device 15 for adjusting the temperature such as a Peltier device or a heater are provided. A voltage signal whose level is proportional to the sensed temperature is outputted from the temperatuer sensor 14, and the sensed voltage is supplied to an error detector 16 as one of signels to be compared with each other. As a reference input signal of the error detector 16, a set voltage signal is supplied from a temperature setting device 17 in accordance with a set temperature. The setting of temperature in the temperature setting device 17 is performed by a manual adjusting operation. As the output signal of the error detector 16, a voltage corresponding to an error component of the temperature sensed by the temperature sensor 14 with respect to the temperature set by the temperature setting device, is derived. This error voltage is supplied to the temperature adjusting device 15 through a driver 18.

Also in the case of the arrangement described above, the holographic element 30 does not function properly if the apical angle of the conical wave front of the incident light is different from the design value. Therefore, it is necessary to make the apical angle $\theta$ of the conical wave front to be equal to the design value in order to obtain a proper function of the holographic element 30. On the other hand, if the wavelength of the incident light changes, the holographic element 30 functions equivalently as in the case where a different apical angle of the conical wave front has been selected in the designing stage. Therefore, by varying the wavelength of the incident light, it is possible to make the apical angle $\theta$ of the conical wave front to be equal to the design value equivalently. Furthermore, it is known that the wavelength of the laser beam emitted from the semiconductor laser 11 varies depending on its temperature.

Therefore, by controlling the wavelength of the laser beam emitted by the semiconductor laser 11 by adjusting its temperature, it is possible to compensate for errors in the apical angle $\theta$ of the conical wave front of the secondary light which are originated by the shape of the fibre-type SHG 10 and deviations in the refractive index. Consequently, the secondary light having the conical wave front can be surely converted to the parallel light having planer wave fronts. The temperatuer control of the semiconductor laser 11 is performed by manually adjusting the set temperature in the temperature setting device 17 until the light emerging from the holographic element 30 becomes a parallel light. After this setting operation, the temperature control is automatically performed by the drive of the temperature adjusting device 15 in response to the error output signal of the error detector 16.

In the embodiment described above, the holographic element 30 having the construction shown in FIGS. 4A and 4B is used. However, as in the case of the first embodiment, other type of holographic elements such as those illustrated in FIGS. 6A and 6B, 8A and 8B can be used also.

In the forgoing, the present invention has been explained by way of example in which the apical angle of the conical wave front of the light incident on the holographic element 30 is varied equivalently by adjusting the temperature of the semiconductor laser 11. On the other hand, if the pitch of the ring zones 32 of the holographic element 30 is varied by the thermal expansion of the holographic element 30, its function becomes equivalently substantially the same as in the case where the apical angle of the conical wave front has been changed in the designing stage. Therefore, it is also possible to adopt a construction in which the temperature of the holographic element 30 is controlled. In such a case, the construction of the device is the same as the embodiment illustrated in FIG. 10 except that the temperature sensor 14 and the temperature adjusting device 15 are connected to the holographic element 30.

As described in the foregoing, in the fibre-type light conversion device according to the second feature of the present invention, a holographic element is used as the means for converting the secondary light into the parallel light, and errors in the apical angle $\theta$ of the conical wave front of the secondary light, which are generated by the shape of the fibre-type SHG or variations in the refractive index, are compensated for by controlling the temperature of the light source of the holographic element. Thus, the parallel light having planer wave fronts is surely generated by using the holographic element which is easy to produce, highly applicable to the mass production, and is obtainable at low cost.

What is claimed is:

1. A fibre-type light conversion device comprising a fibre-type light conversion element for converting the wavelength of an incident light beam, and a converting means for converting said incident light into a parallel light, said incident light having been converted in frequency by said fibre-type light conversion element, wherein a holographic element having a complex transparency varying periodically with respect to the distance from its optical axis, is used as said converting means.

2. A fibre-type light conversion device as claimed in claim 1, wherein said holographic element is made of a transparent substrate having a plurality of ring zones of an opaque film, said ring zones being arranged concentrically with a constant pitch on one surface of said substrate.

3. A fibre-type light conversion device as claimed in claim 1, wherein said holographic element is made of a transparent substrate having a plurality of ring zones each having a rectangular cross-section, said ring zones being arranged concentrically with a constant pitch on one surface of said substrate.

4. A fibre-type light conversion device as claimed in claim 1, wherein said holographic element is made of a transparent substrate having a plurality of ring zones forming a cross-section of a saw-tooth shape, said ring zones being arranged concentrically with a constant pitch on one surface of said substrate.

5. A fibre-type light conversion device comprising:
a light source;
a fibre-type light conversion element for receiving a light beam emerged from said light source and converting the wavelength of said light beam;
a holographic element for converting said light beam, whose wavelength has been converted by said light conversion element, into a parallel light; and
a temperature control means for controlling the temperature of said light source.

6. A fibre-type light conversion device as claimed in claim 5, wherein said temperature control means comprises a temperature sensing means for sensing the temperature of said light source, a temperature setting means for determining a set temperature, an error detection means for detecting an error of the temperature sensed by said temperature sensing means with respect to said set temperature determined by said temperature setting means, and a temperature adjusting means for adjusting the temperature of said light source on the basis of said error detected by said error detection means.

7. A fibre-type light conversion device comprising:
a light source;
a fibre-type light conversion element for receiving a light beam emerged from said light source and converting the wavelength of said light beam;
a holographic element for converting said light beam, whose wavelength has been converted by said light conversion element, into a parallel light; and
a temperature control means for controlling the temperature of said holographic element.

8. A fibre-type light conversion device as claimed in claim 7, wherein said temperature control means comprises a temperature sensing means for sensing the temperature of said holographic element, a temperature setting means for determining a set temperature, an error detection means for detecting an error of the temperature sensed by said temperature sensing means with respect to said set temperature determined by said temperature setting means, and a temperature adjusting means for adjusting the temperature of said holographic element on the basis of said error detected by said error detection means.

* * * * *